United States Patent
Mastin

[11] 3,907,324
[45] Sept. 23, 1975

[54] VEHICLE SUSPENSION SYSTEM
[75] Inventor: John B. Mastin, Walnut Creek, Calif.
[73] Assignee: Hendrickson Manufacturing Company, Lyons, Ill.
[22] Filed: Nov. 21, 1973
[21] Appl. No.: 417,734

[52] U.S. Cl. .............................. 280/104.5 A; 267/44
[51] Int. Cl. ............................................. B60g 11/10
[58] Field of Search.. 280/104.5 R, 104.5 A, 124 R, 280/112 R; 267/63 R, 44

[56] References Cited
UNITED STATES PATENTS

| | | | |
|---|---|---|---|
| 1,784,268 | 12/1930 | Buckendale | 280/104.5 R |
| 2,067,861 | 1/1937 | Robin | 280/104.5 R |
| 2,071,480 | 2/1937 | Williams | 280/104.5 A |
| 2,367,434 | 1/1945 | Roos | 280/124 R |
| 2,560,501 | 7/1951 | Webster | 280/104.5 R |
| 3,632,128 | 1/1972 | Raidel | 280/104.5 R |

Primary Examiner—Philip Goodman
Assistant Examiner—John A. Carroll

[57] ABSTRACT

A suspension system for the tandem axles of a recreational vehicle comprises a pair of leaf spring assemblies attached to respective side members of the vehicle frame, and a pair of load distribution beams pivotally attached in supporting relationship thereto. The forward ends of the beams are connected to the leading axle housing by means of single-point attachments, and a torque arm, connected between this housing and the vehicle frame, is provided to prevent rotation of the housing while the leading axle is driven. To conserve space within the vehicle frame, and to provide a lighter weight, more economical suspension system, the rear ends of the load distribution beams are connected to the rear axle housing by means of two-point attachments which prevent rotation of the housing during braking or acceleration and obviate the need for an additional torque arm between the rear axle housing and the vehicle frame.

8 Claims, 6 Drawing Figures

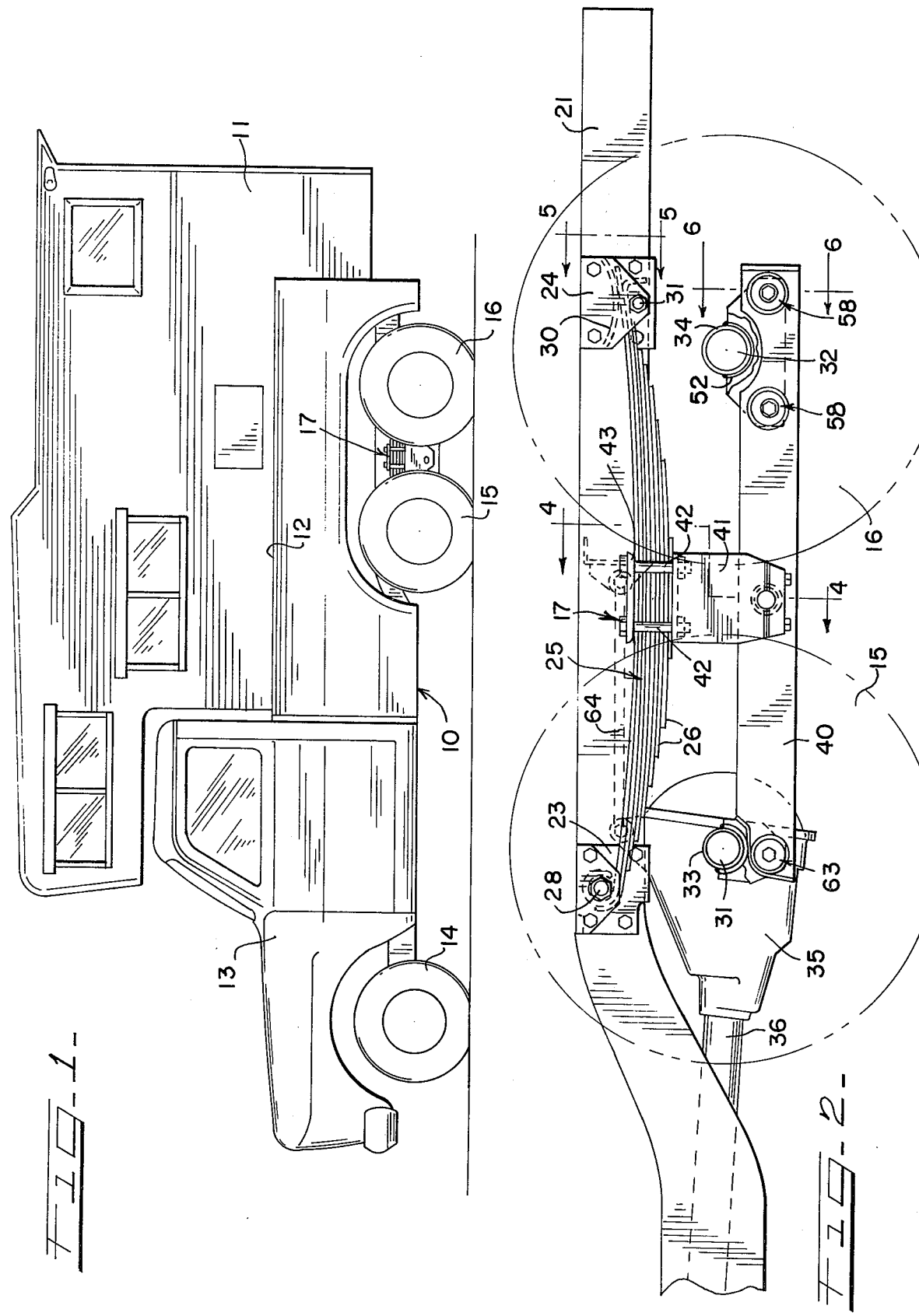

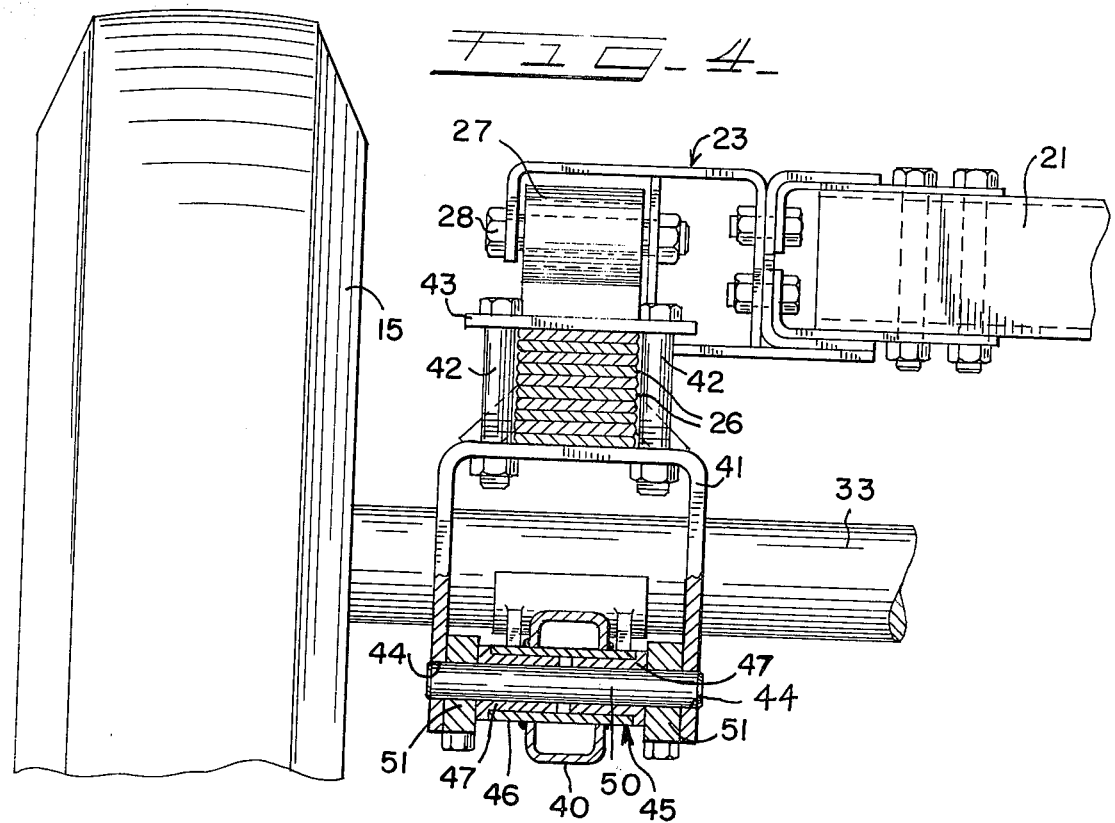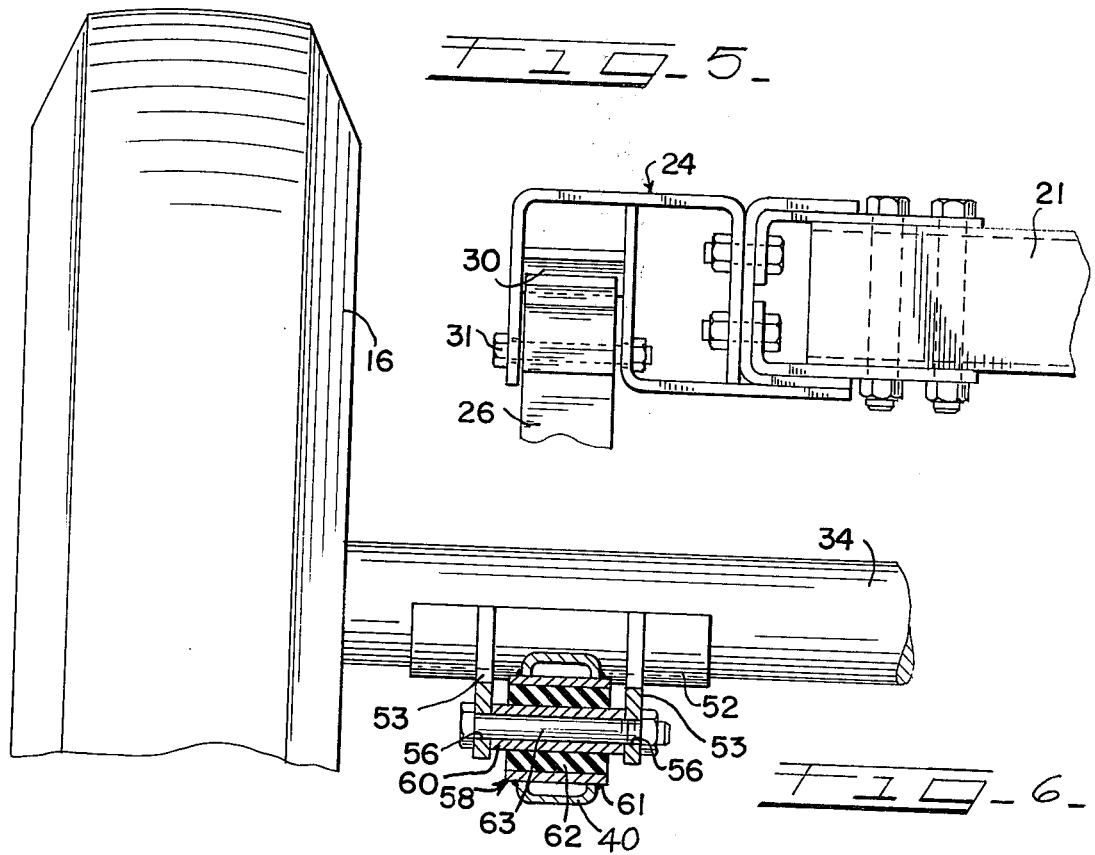

3,907,324

VEHICLE SUSPENSION SYSTEM

BACKGROUND OF THE INVENTION

The present invention relates generally to suspension systems, and more particularly to a suspension system for tandem-axle equipped recreational vehicles.

With the trend toward increased size and weight in camper and motor-home type recreational vehicles (RV's), the need has developed for an economical light-weight rear suspension system capable of supporting the relatively heavy high center-of-gravity loads of such vehicles under varying road conditions. To avoid highway weight and axle limitations, too provide better off-road performance, and to gain greater stability and safety the trend in larger sized RV's has been to utilize tandem-axle type rear suspension system. Unfortunately, such tandem axle suspensions have heretofore required additional space within the vehicle chassis for accommodating necessary support members. With the increased use of such accessories as air conditioning, electric generators, pressurized water supplies, holding tanks and the like on RV's, space within the RV frame is often at a premium, so that use of this space to accommodate the vehicle suspension system may impose severe design limitations on the RV design. Furthermore, with the limited poser frequently available for pulling RV's it is desirable that suspension systems for these vehicles be light in weight, and with the highly competitive nature of the RV market, economical to manufacture.

Accordingly, it is a general object of the present invention to provide a new and improved suspension system for recreational vehicles or the like.

It is another object of the present invention to provide a new and improved tandem-axle type suspension system.

It is another object of the present invention to provide a new and improved tandem-axle type suspension system for the rear wheels of a recreational vehicles or the like.

It is another object of the present invention to provide a new and improved tandem-axle suspension system for recreational vehicles or the like which is lighter in weight and less costly to manufacture.

It is another object of the present invention to provide a new and improved suspension system for recreational vehicles or the like which requires minimum space for supporting members within the frame of the vehicle.

SUMMARY OF THE INVENTION

The invention is directed, in a vehicle of the type having a frame and a tandem-axle assembly including a leading axle, a leading axle housing, a trailing axle, a trailing axle housing, and means for driving the leading axle, to an improved tandem-axle suspension system comprising resilient support means including a pair of spring assemblies depending from the vehicle frame, and a pair of longitudinally extending load distribution beams pivotally attached in supporting relationship to respective ones of the spring assemblies. The suspension system further comprises suspension means for the leading axle housing comprising a single-point attachment between the housing and each of the load distribution beams whereby the leading axle housing is free to pivot relative to the beams, suspension means for the trailing axle assembly comprising a multiple point attachment between the trailing axle housing and each of the load distribution beams whereby the trailing axle housing is pivotally fixed relative to the beams, and means comprising a torque arm extending between the leading axle housing and the vehicle frame for limiting rotation of the leading axle housing relative to the frame.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

FIG. 1 is a side elevational view of a recreational vehicle comprising a camper body mounted on a pick-up truck having a rear tandem-axle suspension system constructed in accordance with the present invention.

FIG. 2 is a side elevational view of a tandem-axle suspension system of the present invention showing its attachment to the chassis of the recreational vehicle of FIG. 1.

FIG. 4 is an enlarged cross-sectional view taken along lines 4—4 of FIG. 2.

FIG. 5 is an enlarged cross-sectional view taken along lines 5—5 of FIG. 2.

FIG. 6 is an enlarged cross-sectional view taken along lines 6—6 of FIG. 2.

DESCRIPTION OF THE PREFERRED EMBODIMENT

Figure 3:
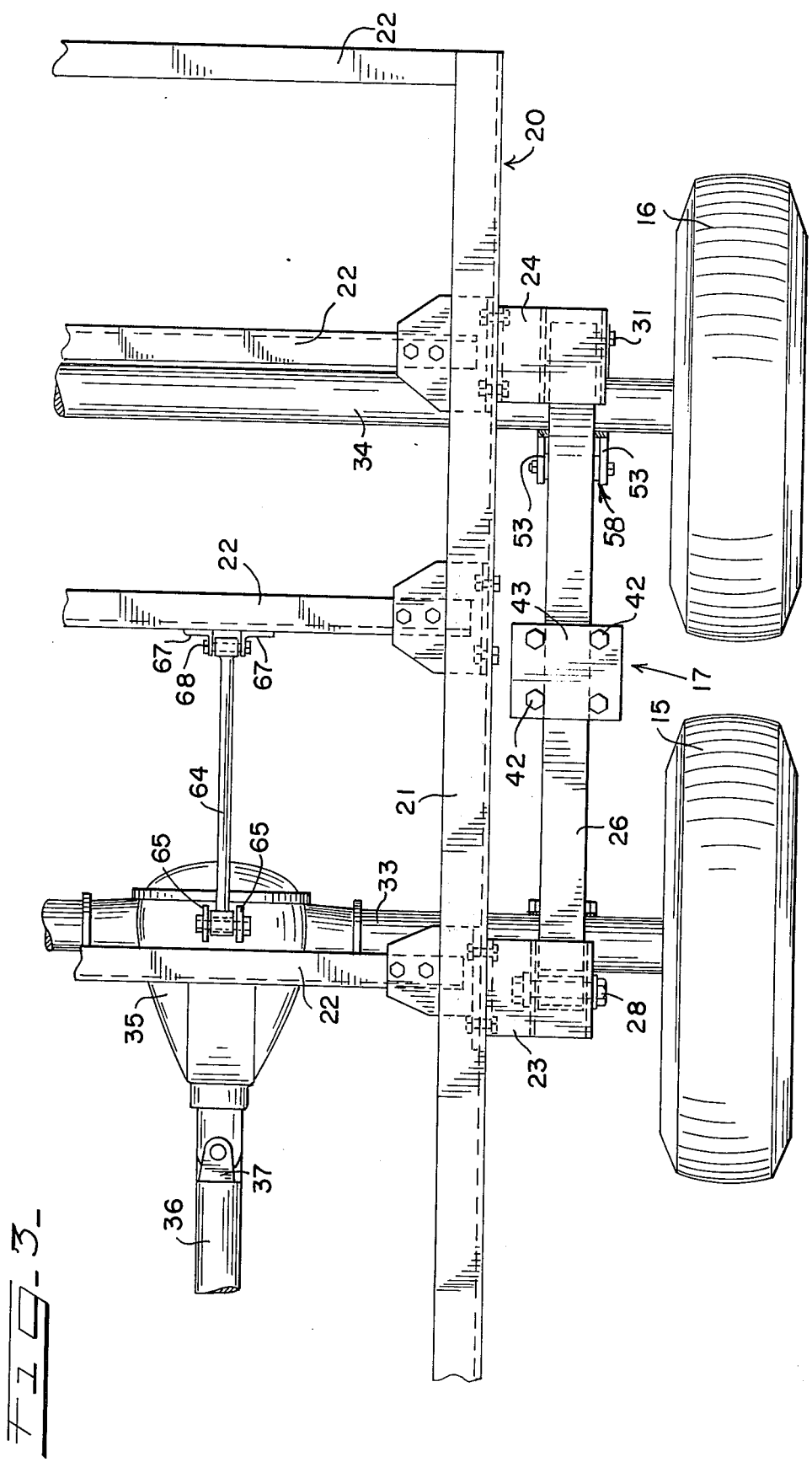
FIG. 3 is a fragmentary top plan view of the suspension system of the present invention showing its attachment to the frame of the recreational vehicle of FIG. 1.

Referring to FIG. 1, the suspension system of the present invention is shown incorporated in a recreational vehicle 10 comprising a camper body 11 mounted to the rear bed 12 of a pick-up truck 13. The front end of the truck is supported by a pair of front wheels 14 in conjunction with a single-axle type suspension system, and the rear end is supported by leading and trailing pairs of wheels 15 and 16 in conjunction with a tandem-axle type suspension system indicated generally at 17. The camper body 11 provides sleeping, eating, and traveling quarters, and in accordance with current practice, may include accessories such as an air conditioner, an electric generating plant, a pressurized water supply, and a holding tank, either within the camper body or under the rear bed 12 of the truck.

Referring to FIG. 2 and 3, the recreational vehicle 10 is equipped with a longitudinally-extending frame 20 of conventional design extending from the forward or head end of the vehicle 10 to the rear or tail end. The frame comprises a pair of spaced-apart longitudinally-extending side members 21 interconnected at one or more points by one or more cross-members 22. In practice, the space between side members 21, and particularly that adjacent to and above suspension 17 and the axle housings thereof, may be utilized for containing RV accessories, such as holding tanks, water tanks, generators, compressors, etc.

The tandem-axle suspension assembly 17 is attached to the rear of the vehicle frame 20 by means of front and rear bracket assemblies 23 and 24, respectively, which are disposed in longitudinally spaced relationship on each of the frame side members 21. Since both sides of the rear suspension system are identical, reference will henceforth be made only to one side, as viewed in FIG. 2, it being understood that the other side is identical in structure and operation. Bracket assemblies 23 and 24 each operatively engage and retain opposite ends of a resilient support member in the form of a leaf spring assembly 25. This assembly may be conventional in design and construction, comprising a stack of flat leafs 26 of spring steel of upwardly progressively increasing in length. It will be appreciated that other types of resilient support members may be used instead, such as air cushion units, or a stack of concentrically arranged sleeve members of rigid annd resilient material, as particularly described in U.S. Pat. No. 2,980,439 to Earl Miller, which is assigned to the present assignee.

To securely retain the leaf spring assembly in position, the front end of the top or longest leaf on each side of the RV frame is wrapped around a cushion forming cylindrical sleeve 27 (FIG. 4), which comprises part of the front bracket assembly 23, and which is held in place by a bolt 28. The rear end of the longest leaf bears upwardly against a downwardly arcuate shoe 30, which comprises part of the rear bracket assembly 24. A bolt 31 may be provided to retain the rear end of the leaf in position when weight is removed from the suspension, as when the vehicle is jacked up for service.

The leading and trailing wheels 15 and 16 of tandem-axle suspension system 17 are mounted on leading and trailing axles 31 and 32, the inner ends of which are received and held in alignment by leading and trailing axle housings 33 and 34 (FIG. 3). The leading axle housing 33 incorporates a differential drive assembly 35, which contains appropriate gearing for translating drive power from a forwardly extending conventional drive shaft 36 and universal joint 37 to the leading axles 31 on both sides of the vehicle.

The weight of the vehicle is supported by the front wheels 14, and the tandem rear wheels 15 and 16. The weight on the rear wheels is divided between the leading and trailing wheels by means of a load distribution beam 40 which extends longitudinally beneath the front and rear axle housings 33 and 34. The front end of distribution beam 40 is attached to the leading axle housing 33 at a single point, which allows housing 33 a degree of rotational freedom relative to the front end of the load distribution beam 40. The rear end of distribution beam 40 is connected to the trailing axle housing 34 at two points, which allows no rotational freedom for housing 34 relative to the load distribution beam.

Referring to FIG. 4, the load distribution beam 40 comprises a holllow beam of rectangular cross section having walls dimensioned as required by the design load of the suspension system. The leaf spring assembly 25 is supported at the center of the load distribution beam 40 by means of a centrally disposed inverted U-shaped saddle bracket 41. This bracket is shackled to the leaf spring stack by means of four bolts 42 which extend upwardly in spaced pairs on either side of the stack and through apertures in a top plate 43, which is drawn downwardly against the top leaf to hold the stack in compression. To obtain a resilient pivotal connection with the load distribution beam 40 the downwardly depending plates or legs of bracket 41 are provided with transversely aligned bores 44 at opposite ends thereof and a cylindrical bushing 45 which extends between and connects the bores. The bushing comprises an outer metal sleeve 46 which receives the inner ends of a pair of flanged plug members 47 and 48, the latter being connected when inserted in sleeve 46 by a shaft segment 50 which extends between bores 44. A pair of saddle caps 51 are attached to shaft segment 50 adjacent the inside surfaces of the legs of bracket 41 to space the load distribution beam therefrom, and to secure shaft segment 50 in position.

Referring now to FIG. 6, each of the attachment points to the trailing axle housing 34 comprises a base member 52 in the form of approximately half of a tubular section which is adapted to fit over the bottom of the axle housing 34 and to be welded or otherwide rigidly secured thereto. Two parallel plate sections 53 are disposed to extend downwardly from the bottom of base member 52 with sufficient lateral spacing so that their inside faces are separated by a greater distance than the width of the end portion of the load distribution beam 40. These plates are provided with two pairs of transversely aligned bores or openings 56 at opposite ends thereof, and a pair of cylindrical bushings 58 are provided between the openings or bores to obtain a resilient attachment to the load distribution beam. The bushings 58, as shown in FIG. 6, each comprises an inner metal sleeve 60, an outer metal sleeve 61, and a cushion forming cylindrical sleeve 62 of rubber or a rubber-like material interposed between the outer sleeve and the inner sleeve and bonded thereto in a known manner. The inner sleeves are secured in position between the bores 56 by bolts 63, the cushion forming sleeves 62 providing resilient connections between the axle housing 34 and the load distribution beam 40.

The single attachment point of the front axle housing 33 to the load distribution beam 40 may utilize a bushing 63 identical to the aforedescribed bushings 58 utilized at the attachment points of housing 34 and, accordingly, will not be described in detail.

To transfer the forward and reverse forces acting on housing 33 to the vehicle frame 20 when the leading wheels 15 are driven by differential 35, a torque arm 64 is included in suspension 17. This torque arm is pivotally connected to housing 33 at one end by means of a pair of parallel spaced-apart ears 65 (FIG. 3) attached to the top of the differential housing, and a locking pin 66 which extends therebetween and through an aperture in one end of the rod. The other end of torque rod 64 is similarly connected to frame 20 by means of a pair of flanges 67 attached to a cross member 22 and a locking pin 68. This arrangement prevents housing 33 from undesirably rotating about the beam end connection 63. Furthermore, by transferring the force exerted on axle housing 33 directly to the frame, i.e., through cross member 22, torque arm 64 avoids the application of longitudinal forces on the spring assembly 25 for improved handling and traction.

The bracket assemblies 23 and 24 of suspension 17 enable the load distribution beams 40 to be positioned outside of the side frame members 21 for greater space within the vehicle frame. Furthermore, the rear axle housings 34, being connected to the rear ends of the load distribution beams 40 by two-point attachments, prevent the rear axle housing 34 from rotating during braking or acceleration. This obviates the need for a second torque rod with its attendant space requirements and weight penalty within the RV chassis, and frees the area between side members 21 for accommodating RV accessories such as holding tanks, water tanks, generators, compressors, etc.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a vehicle of the type having a frame and a tandem axle assembly including a leading axle, a leading axle housing, a trailing axle, a trailing axle housing, and means for driving said leading axle, an improved tandem axle suspension system comprising:
   resilient support means including a pair of spring assemblies depending from said vehicle frame;
   a pair of longitudinally extending load distribution beams pivotally attached in supporting relationship to respective ones of said spring assemblies;
   attachment means for said leading axle housing comprising a pair of single-point attachment assemblies connecting said housing and one end of each of said load distribution beams whereby said front axle housing is free to pivot relative to said beams;
   attachment means for said trailing axle housing comprising a pair of multiple-point attachment assemblies connecting said trailing axle housing and the other end of each of said load distribution beams whereby the angular position of said trailing axle housing is fixed relative to said beams; and
   means comprising a torque arm extending between said leading axle housing and said vehicle frame for limiting rotation of said leading axle housing relative to said frame.

2. A tandem-axle type suspension system as defined in claim 1 wherein said vehicle frame comprises a pair of longitudinally extending frame members, said resilient support means comprise a pair of longitudinally-spaced brackets on each of said frame members and a pair of leaf springs disposed to extend between respective ones of said bracket pairs, and wherein said load distribution beams are pivotally attached to respective ones of said leaf springs between said longitudinally-spaced brackets.

3. A tandem-axle type suspension system as defined in claim 2 wherein said means for driving said leading axle comprise a differential gear assembly contained within said leading axle housing.

4. A tandem-axle type suspension system as defined in claim 1 wherein said vehicle frame includes at least one cross member extending between said longitudinally extending members, and wherein said torque arm extends between said front axle housing and said cross member.

5. A tandem-axle type suspension system as defined in claim 1 wherein said single-point attachment assemblies each include a single attachment point, said multiple-point attachment assemblies each include at least two attachment points, and wherein said attachment points each comprise an outer sleeve fixed relative to respective ones of said axle housings, an inner sleeve fixed relative to respective ones of said load distribution beams, and a cushion forming cylindrical sleeve interposed between said outer and inner sleeves.

6. In a vehicle of the type having a frame and a tandem axle assembly including a leading axle, a leading axle housing, a trailing axle, a trailing axle housing, and means for driving said leading axle, an improved tandem axle suspension system comprising:
   resilient support means including a pair of spring assemblies depending from said vehicle frame;
   a pair of longitudinally-extending load distribution beams pivotally attached in supporting relationship to respective ones of said spring assemblies;
   attachment means for said leading axle housing comprising a pair of single-point attachment assemblies connecting said housing to one end of each of said load distribution beams whereby said front axle housing is free to pivot relative to said beams, said single-point attachment assemblies each including a single attachment point comprising a pair of spaced-apart plates depending from said leading axle housing, an outer sleeve fixed relative to said plates, an inner sleeve fixed relative to a respective ones of said load distribution beams, and a cushion forming cylindrical sleeve interposed between said outer and inner sleeves to isolate said load distribution beams from said leading axle housing;
   attachment means for said trailing axle housing comprising a pair of multiple-point attachment assemblies connecting said trailing axle housing and the other ends of said load distribution beams whereby the angular position of said trailing axle housing is fixed relative to said beams, said multiple-point attachment assemblies each including at least two attachment points each comprising a pair of spaced-apart plates depending from said trailing axle housing, an outer sleeve fixed relative to said plates, an inner sleeve fixed relative to a respective one of said load distribution beams, and a cushion forming cylindrical sleeve interposed between said outer and inner sleeves; and
   means comprising a torque arm extending between said leading axle housing and said vehicle frame for limiting rotation of said leading axle housing relative to said frame.

7. A tandem-axle type suspension system as defined in claim 6 wherein said load distribution beams are each pivotally attached to said spring assemblies by means of a pair of brackets comprising laterally spaced plate members cradling respective ones of said spring assemblies and a pair of transversely extending bushings, said brackets and said load distribution beams having aligned apertures therein for receiving respective ones of said bushings.

8. A tandem-axle type suspension system as defined in claim 7 wherein said transversely extending bushings each comprise an outer sleeve member secured to said load distribution beam, a pair of cylindrical plug members each having a flange portion of increased diameter at one end, and a shaft segment extending through said plug members and into engagement with said downwardly depending plates, the reduced diameter portions of said plug members extending into opposite ends of said outer sleeve member whereby said flange portions cushion movement between said bracket and said load distribution beam.

* * * * *

UNITED STATES PATENT AND TRADEMARK OFFICE
CERTIFICATE OF CORRECTION

PATENT NO. : 3907324
DATED : 09/23/75
INVENTOR(S) : Mastin, John B.; Walnut Creek, Calif.

It is certified that error appears in the above-identified patent and that said Letters Patent are hereby corrected as shown below:

In column 1, line 13, the word appearing as "too" should read --to--.
In column 1, line 26, the word appearing as "poser" should read --power--.
In column 1, line 39, the word appearing as "vehicles" should read --vehicle--.
In column 3, line 16, the word appearing as "annd" should read --and--.
In column 3, line 18, the word appearing as "Earl Miller" should read --R. Earl Miller--.
In column 3, line 57, the word appearing as "holllow" should read --hollow--.
In column 4, line 17, the word appearing as "otherwide" should read --otherwise--.

Signed and Sealed this sixth Day of January 1976

[SEAL]

Attest:

RUTH C. MASON
*Attesting Officer*

C. MARSHALL DANN
*Commissioner of Patents and Trademarks*